US009955533B2

United States Patent
Pham et al.

(10) Patent No.: US 9,955,533 B2
(45) Date of Patent: Apr. 24, 2018

(54) INDUCTION SHIELD AND ITS METHOD OF USE IN A SYSTEM

(75) Inventors: Quoc Tran Pham, Anaheim, CA (US); Sean Timothy O'Keeffe, Tustin, CA (US); Joseph Stevick, Olympia, WA (US); Theodore A. Waniuk, Lake Forest, CA (US)

(73) Assignee: CRUCIBLE INTELLECTUAL PROPERTY, LLC., Rancho Santa Margarita, CA (US)

( * ) Notice: Subject to any disclaimer, the term of this patent is extended or adjusted under 35 U.S.C. 154(b) by 731 days.

(21) Appl. No.: 14/374,803

(22) PCT Filed: Sep. 20, 2011

(86) PCT No.: PCT/US2011/052354
§ 371 (c)(1),
(2), (4) Date: Dec. 4, 2014

(87) PCT Pub. No.: WO2013/043156
PCT Pub. Date: Mar. 28, 2013

(65) Prior Publication Data
US 2015/0131694 A1 May 14, 2015

(51) Int. Cl.
*H05B 6/22* (2006.01)
*H05B 6/02* (2006.01)
(Continued)

(52) U.S. Cl.
CPC .............. *H05B 6/20* (2013.01); *B29C 45/72* (2013.01); *F27B 14/061* (2013.01); *F27D 11/06* (2013.01);
(Continued)

(58) Field of Classification Search
CPC ... F27D 11/06; F27D 2099/0015; H05B 6/20; H05B 6/24; H05B 6/26; H05B 6/108;
(Continued)

(56) References Cited

U.S. PATENT DOCUMENTS

| 1,823,908 A | * | 9/1931 | Long | H05B 6/367 |
| | | | | 373/158 |
| 1,904,665 A | * | 4/1933 | Northrup | H05B 6/24 |
| | | | | 373/144 |

(Continued)

FOREIGN PATENT DOCUMENTS

| GB | 392764 | 5/1933 |
| GB | 574914 | 1/1946 |

(Continued)

OTHER PUBLICATIONS

International Search Report/Written Opinion, PCT/ISA/210, PCT/ISA/220, PCT/ISA/237, dated Mar. 16, 2012.

*Primary Examiner* — Hung D Nguyen
(74) *Attorney, Agent, or Firm* — Foley & Lardner LLP

(57) ABSTRACT

An induction shield is configured to substantially reduce emissions emitted from an induction heat source (e.g., coil) during use. The shield is positioned adjacent to a vessel (e.g., in an injection system) having a melting portion configured to receive meltable material to be melted therein and an induction heat source positioned adjacent the vessel configured to melt the meltable material received in the melting portion of the vessel. The shield may include a tube configuration configured to flow liquid therein to absorb heat emitted from the heat source. The tube configuration can comprise a single tube or multiple tubes. The shield can be positioned adjacent the induction source in a helical manner, for example, or at ends of the vessel. The shield can be used during melting of amorphous alloy and for forming a part.

20 Claims, 10 Drawing Sheets

(51) Int. Cl.
    *H05B 6/20*     (2006.01)
    *F27B 14/06*    (2006.01)
    *F27D 11/06*    (2006.01)
    *B29C 45/72*    (2006.01)
    *F27D 99/00*    (2010.01)

(52) U.S. Cl.
    CPC ..... *F27D 2099/0015* (2013.01); *Y02P 10/253* (2015.11); *Y10T 29/4998* (2015.01)

(58) Field of Classification Search
    CPC ....... H05B 6/365; B29C 45/72; F27B 14/061; Y10T 29/4996; Y02P 10/253
    USPC ....... 373/151, 152, 154, 155, 156, 161, 150, 373/158
    See application file for complete search history.

(56) References Cited

U.S. PATENT DOCUMENTS

| | | | | |
|---|---|---|---|---|
| 3,056,847 A | * | 10/1962 | Junker | H05B 6/26 373/141 |
| 3,297,811 A | * | 1/1967 | Kugler | H05B 6/20 373/165 |
| 3,805,010 A | * | 4/1974 | Cuvelier | H05B 6/102 219/643 |
| 4,351,055 A | * | 9/1982 | Bick | F27B 3/24 373/76 |
| 4,431,901 A | * | 2/1984 | Hull | H05H 1/46 219/632 |
| 6,051,822 A | * | 4/2000 | Bruckner | B22D 41/14 373/154 |
| 2001/0054471 A1 | * | 12/2001 | Kelch | B23B 31/1179 156/85 |

FOREIGN PATENT DOCUMENTS

| | | |
|---|---|---|
| GB | 784363 | 10/1957 |
| JP | 201036210 A * | 2/2010 |
| WO | 2005/004559 | 1/2005 |
| WO | 2006/127792 | 11/2006 |

\* cited by examiner

SINGLE LAYER

BI-LAYER

SEGMENTED SHIELD WITH CONNECTORS

INDUCTION SHIELD AND ITS METHOD OF USE IN A SYSTEM

BACKGROUND

Field

The present disclosure is generally related to vessels used for melting materials.

Description of Related Art

When heating a body such as a vessel or boat to melt a metal or an alloy therein, energy can dissipate and/or heat surround parts of a system. For example, when an induction heater or coil is used to heat a boat, radiofrequency (RF) waves can be released in many directions from the coil. Heat from such waves may not be fully utilized by the material to be melted that is within the boat. Sometimes, it can heat surrounding parts in the machine or device. Reducing and/or preventing such heat losses will at least reduce heating of the injection device and temperatures of materials to be melted.

SUMMARY

One aspect of the disclosure provides an induction shield configured to be positioned adjacent to a vessel having a melting portion configured to receive meltable material to be melted therein and to an induction heat source that is positioned adjacent the vessel and configured to melt the meltable material received in the melting portion. The shield is configured to substantially reduce emissions emitted from the induction heat source during use.

Another aspect of the disclosure provides a method for melting meltable material including: obtaining a vessel having a melting portion configured to receive meltable material to be melted therein; providing the meltable material on the melting portion; melting the meltable material using an induction source provided adjacent to the vessel, and substantially absorbing emissions from the induction source using a shield provided adjacent to at least the induction source.

Yet another aspect of the disclosure provides a method of manufacturing a part of meltable material using an injection system with an induction shield, including: obtaining an induction shield configured to be positioned adjacent at least an induction source in the injection system; positioning the induction shield at least adjacent the induction source; inputting meltable material into vessel comprising a melting portion configured to receive meltable material to be melted therein; melting the meltable material using the induction coil, the induction coil being positioned adjacent the vessel, and reducing emissions from the induction source using the induction shield.

Other features and advantages of the present disclosure will become apparent from the following detailed description, the accompanying drawings, and the appended claims.

DETAILED DESCRIPTION

The methods, techniques, and devices illustrated herein are not intended to be limited to the illustrated embodiments.

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 15:
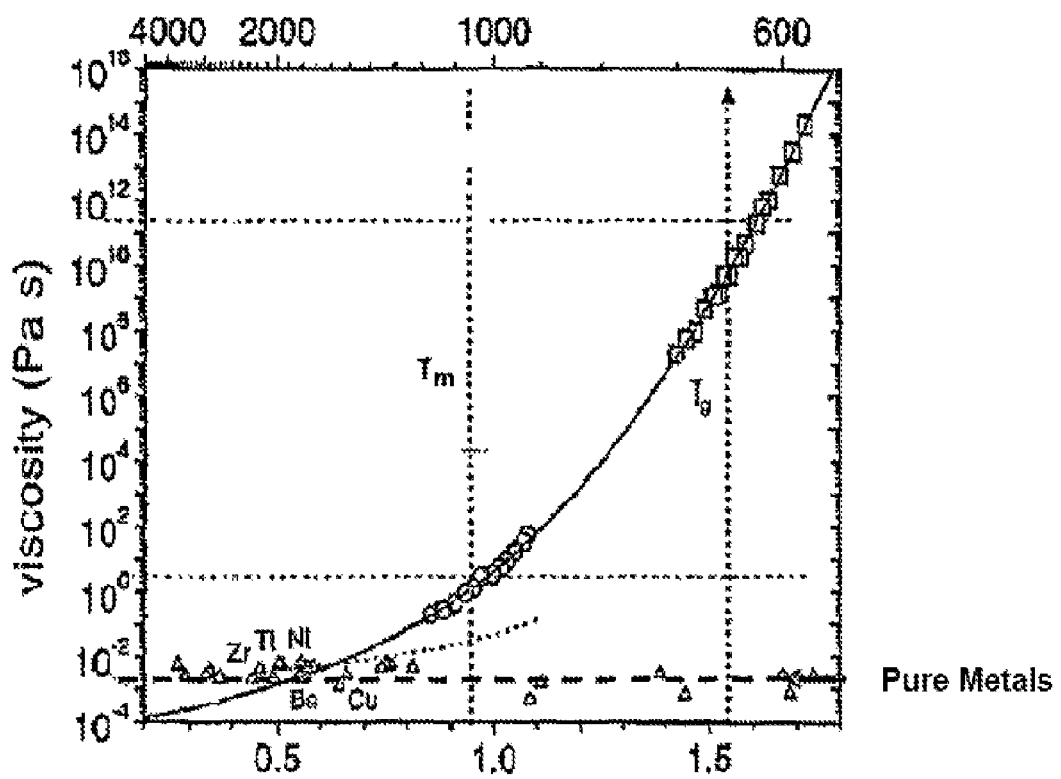
FIG. 15 provides a temperature-viscosity diagram of an exemplary bulk solidifying amorphous alloy.

FIG. 15 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquidmetal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 16:
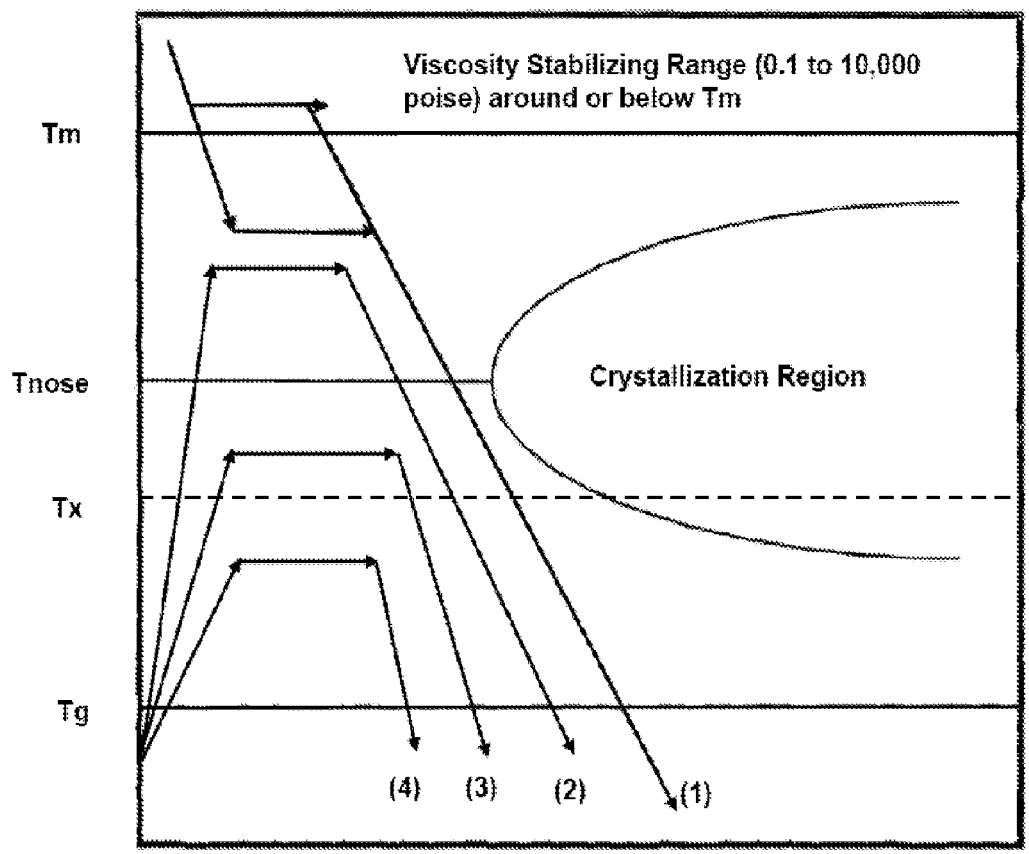
FIG. 16 provides a schematic of a time-temperature-transformation (TTT) diagram for an exemplary bulk solidifying amorphous alloy.

FIG. 16 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 16. In FIG. 16, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

Figure 14:
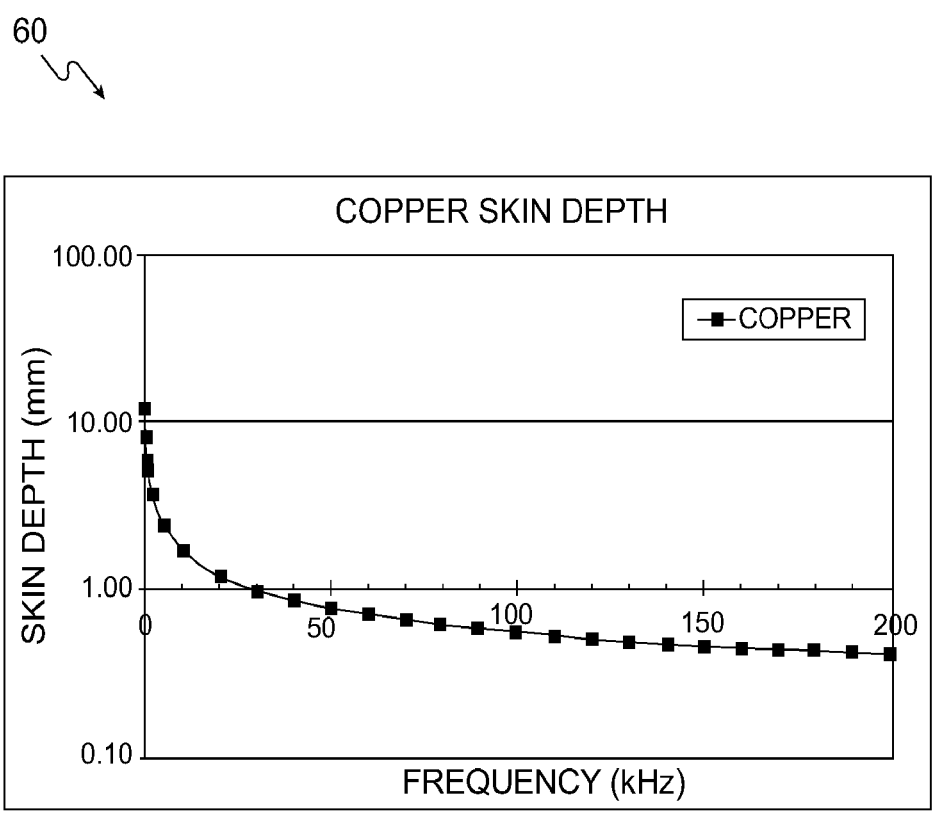
FIG. 14 shows a chart 60 illustrating an exemplary relationship between skin depth (or thickness) (in millimeters, mm) of a shield made of copper and a frequency of an induction source in a range between 1-200 kHz.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 14, Tx is shown as a dashed line as Tx can vary from close to Tm to close to Tg.

The schematic TTT diagram of FIG. 16 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 16, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-Metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function: $G(x,x')=\langle s(x), s(x')\rangle$.

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity. For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase.

The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof. Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof. In one embodiment, the alloy or the composite is completely free of nickel, aluminum, titanium, beryllium, or combinations thereof.

For example, the amorphous alloy can have the formula $(Zr,Ti)_a(Ni,Cu,Fe)_b(Be,Al,Si,B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr,Ti)_a(Ni,Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr,Ti)_a(Ni,Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb,Ti)_b(Ni,Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the aforedescribed alloy system is a Zr—Ti—Ni—Cu—Be based amorphous alloy under the trade name Vitreloy™ such as Vitreloy-1 and Vitreloy-101, as fabricated by Liquidmetal Technologies, CA, USA. Some examples of amorphous alloys of the different systems are provided in Table 1.

The amorphous alloys can also be ferrous alloys, such as (Fe,Ni,Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

TABLE 1

Exemplary amorphous alloy compositions

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | Sn 0.50% | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Au 49.00% | Ag 5.50% | Pd 2.30% | Cu 26.90% | Si 16.30% | |
| 13 | Au 50.90% | Ag 3.00% | Pd 2.30% | Cu 27.80% | Si 16.00% | |
| 14 | Pt 57.50% | Cu 14.70% | Ni 5.30% | P 22.50% | | |
| 15 | Zr 36.60% | Ti 31.40% | Nb 7.00% | Cu 5.90% | Be 19.10% | |
| 16 | Zr 38.30% | Ti 32.90% | Nb 7.30% | Cu 6.20% | Be 15.30% | |
| 17 | Zr 39.60% | Ti 33.90% | Nb 7.60% | Cu 6.40% | Be 12.50% | |
| 18 | Cu 47.00% | Ti 34.00% | Zr 11.00% | Ni 8.00% | | |
| 19 | Zr 55.00% | Co 25.00% | Al 20.00% | | | |

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained.

Electronic Devices

The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Figure 1:
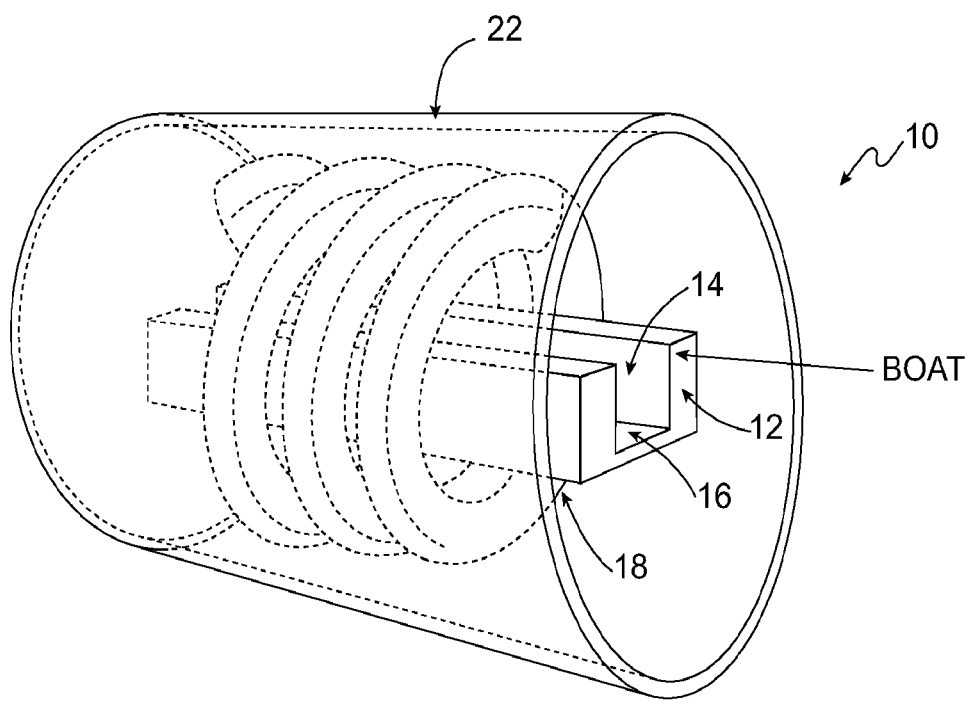
FIG. 1 illustrates a schematic plan view of a vessel with a surrounding induction coil and an induction shield in accordance with an embodiment.

FIG. 1 illustrates an exemplary schematic view of a vessel 10 comprising a body 12 (or base) for meltable material to be melted therein. A vessel as used throughout this disclosure is a container made of a material employed for heating substances to high temperatures. For example, in an embodiment, the vessel may be a crucible, such as a boat style crucible or a skull crucible. In an embodiment, the vessel 10 is a cold hearth melting device that is configured to be utilized for meltable material(s) while under a vacuum (applied by a vacuum source or device, e.g., as shown in FIG. 12).

Vessel 10 may have an inlet (e.g., material input in FIG. 12) for inputting material (e.g., feedstock) into melting portion 14 of the body 12, and an outlet for outputting melted material from the melting portion 14. For example, vessel 10 may receive material (e.g., in the form of an ingot) in its melting portion 14 using one or more devices of an injection system for delivery (e.g., loading port 50 and plunger 52, as shown in the injection system of FIG. 12 or 13). The location or method of insertion of meltable material, as well as the form of the material being inserted (e.g., ingot, powder) is not limiting.

In an embodiment, the body 12 of the vessel 10 comprises a substantially U-shaped structure. For example, the body may have a base with side walls extending vertically therefrom. In an embodiment, the body 12 may have substantially rounded and/or smooth surfaces. For example, surface 16 of the melting portion 14 may be formed in an arc shape (schematically shown in FIG. 10, for example). However, the shape and/or surfaces of the body 12 are not meant to be limiting. The body 12 may be an integral structure, or formed from separate parts that are joined or machined together. The body 12 can also, in accordance with an embodiment, have one or more temperature regulating lines associated therewith (also referred to as cooling lines) (schematically shown as lines 20 in FIG. 3) that are configured to allow for a flow of a liquid (e.g., water, or other fluid) therein for assisting in regulating a temperature of the meltable material received in the melting portion 14 and assist in preventing excessive heating and melting of the body 12 of the vessel 10 itself.

Figure 2:
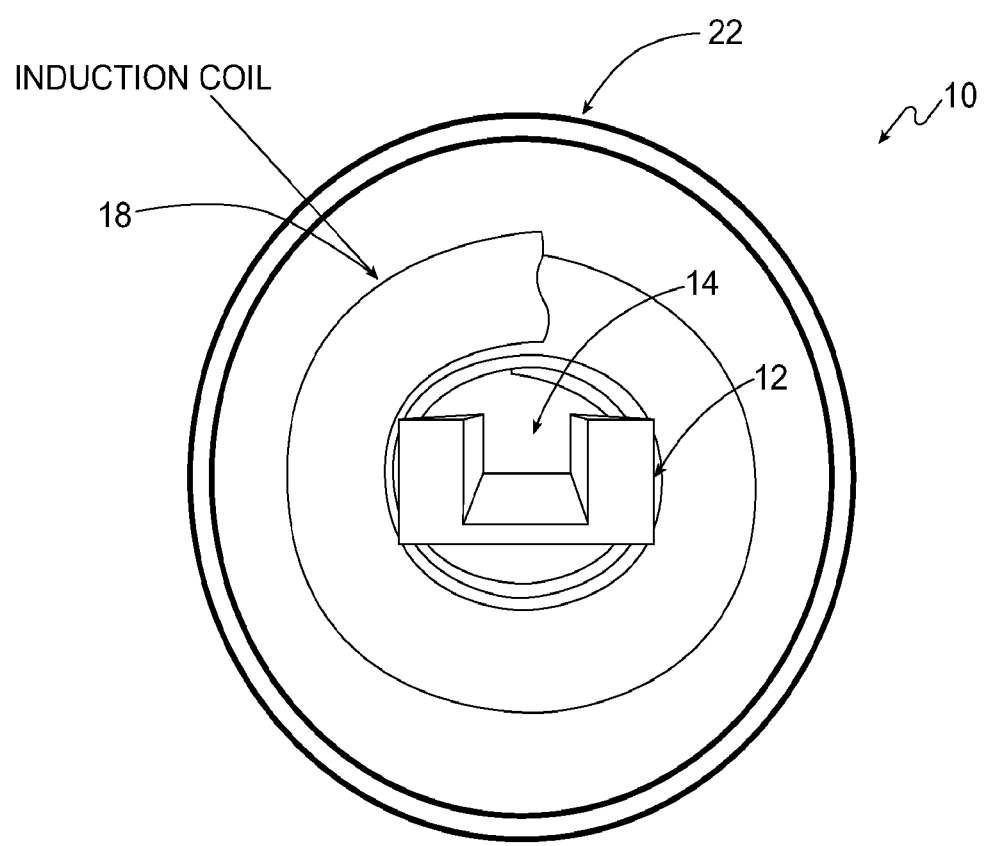
FIG. 2 illustrates an end view of the vessel, coil, and shield of FIG. 1.
Figure 12:
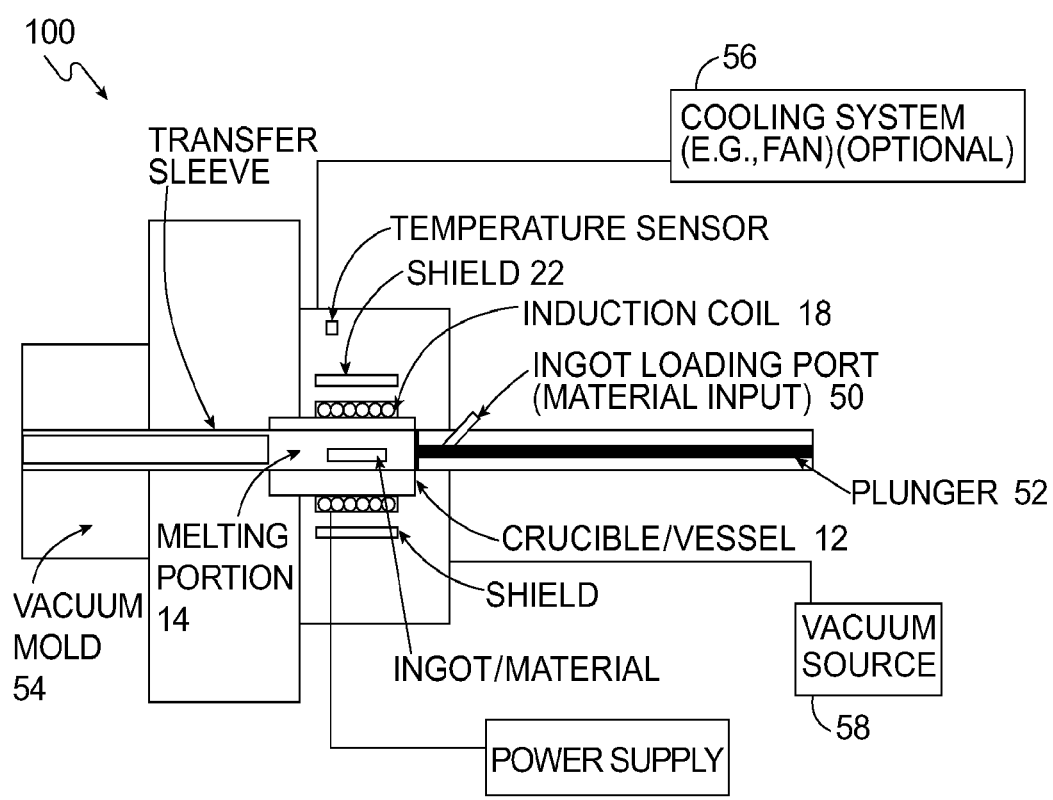
FIGS. 12 and 13 each illustrate a schematic diagram of an exemplary injection system utilizing one or more induction shields as disclosed in FIGS. 1 and 11, respectively.

The material for heating or melting may be received in a melting portion 14 of the vessel (e.g., via a loading port 50, as shown in FIG. 12). Melting portion 14 is configured to receive meltable material to be melted therein. For example, melting portion 14 has surface 16 for receiving material. At least the melting portion 14 of the vessel, if not substantially the entire body 12 itself, is configured to be heated such that the material received therein is melted. Heating is accomplished using, for example, an induction source 18 positioned adjacent the body 12. For example, as shown in FIGS. 1 and 2, the induction source 18 may be in the form of a coil positioned in a helical pattern substantially around a length of the body 12. Accordingly, vessel 10 is configured to inductively melt a material, such as a metal or alloy, within the melting portion 14 by supplying power to induction source/coil 18. The induction coil 18 is configured to heat up and melt any material that is contained by the crucible without melting and wetting the crucible. The induction coil 18 emits radiofrequency (RF) waves towards the vessel 10.

Figure 13:
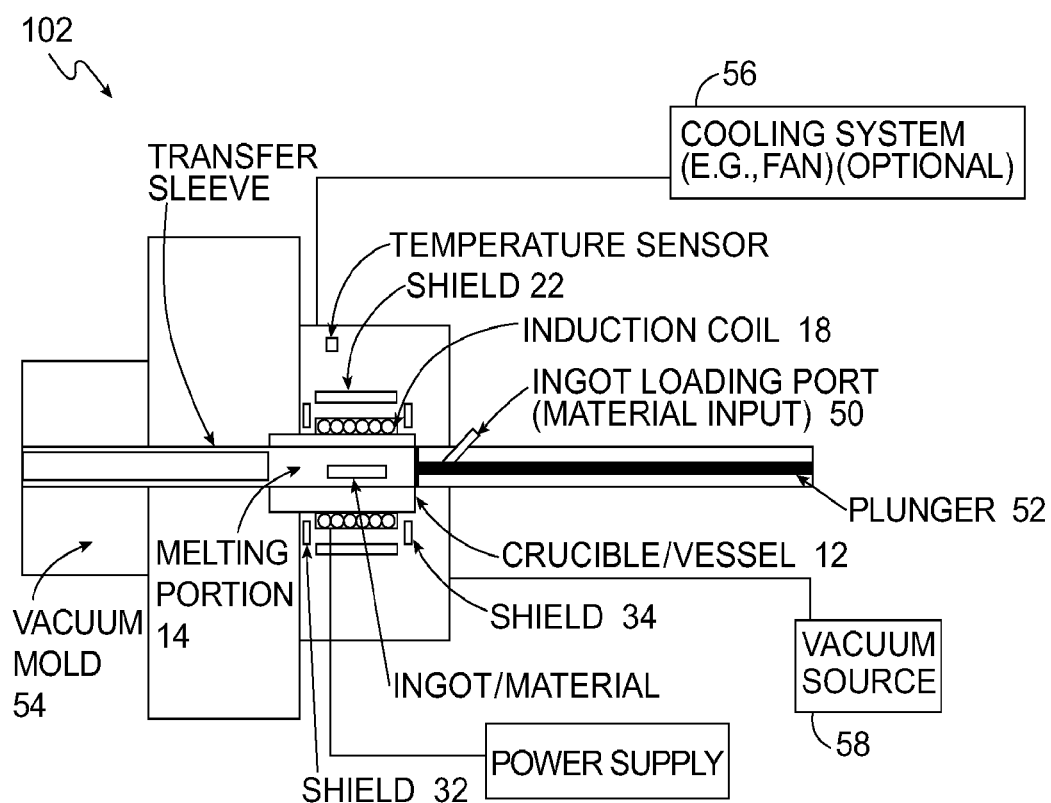

As shown, the body 12 and induction source 18 surrounding vessel 10 can be configured to be positioned in a horizontal direction. For example, vessel 10 may be configured to be used in an injection molding system that is positioned to melt and move material in a horizontal (and longitudinal) direction. FIGS. 12 and 13 schematically illustrate examples of such a system (and are further described below). Vessel 10 may receive material (e.g., in the form of an ingot) in its melting portion 14 using one or more devices of an injection system for delivery (e.g., loading port 50 and plunger 52).

In one embodiment, the material to be melted in such a vessel as vessel 10 is an amorphous alloy, which are metals that may behave like plastic, or alloys with liquid atomic structures.

As previously noted, systems such as those using vessels and induction sources to melt materials such as metals or alloys may implement forced cooling techniques (e.g., cooling lines) to absorb heat from the power/heating source (e.g., induction coil), base, and molten material. Generally, the vessel 10 is cooled to prevent sticking of molten material onto the melting portion 14.

However, there are also stray magnetic (RF) fields from induction source 18 that can heat up unwanted areas or parts of the equipment (e.g., a platen, transfer/cold sleeve, frame, or surrounding parts such as the plunger in an injection system—including their associated equipment (e.g., sensors)) during the melting process (when the induction source is activated to melt the material). That is, when heating a body such as a vessel or boat to melt a metal or an alloy therein, energy can dissipate and/or heat surround parts of a system. For example, when an induction coil is used to heat a boat, radiofrequency (RF) waves can be released in many directions from the coil. Heat from such waves may not be fully utilized by the material to be melted that is within the boat. Sometimes, it can heat surrounding parts in the machine or device. Reducing emissions in undesired directions (and/or, in some cases, increasing emissions in a desired direction), can produce more efficient heating of the meltable material.

Using RF transparent materials (e.g., ceramics) or non-magnetic metals for constructing a body 12 or crucible can result in minimum power loss. However, cost and durability of such materials can cause problems with such a design. Using magnetic metal may be a good alternative (e.g., in terms of durability), but, in some cases, there is required extra power consumption, which is not a small toll. Furthermore, any material located near an oscillating electro-magnetic (EM) field (such as that emitted by induction source 18) will be heated up as well (due to eddy current propagation through the material). Therefore, this disclosure presents using a shield to, among other things, improve the efficiency of the induction system by reducing the amount of stray EM fields which might interact with other parts of the machine or system, and reduce at least the heat damage to parts of the injection system by the magnetic field of the induction source 18 (during melting). The shield is provided to absorb and/or redirect magnetic fields and emissions (radio-frequency electromagnetic radiation) from the induction source 18, and, in some cases, expel it in the form of heat via conduction, convection, or cooling lines. The shield is configured to be positioned adjacent to induction source 18 and/or body 12 of vessel 10. The shield can be positioned within and/or attached to parts of an injection molding system or machine surrounding the vessel 10, for example. The shield can be placed anywhere in or on the injection molding machine to block stray RF emitted from the induction coil 18. As further disclosed below, the shield can be incorporated into surrounding parts to protect surrounding parts from getting hot, among other things (i.e., protect the platen, part of the plunger rods, IR temperature sensor, frame of the molding machine around the crucible). In accordance with an embodiment, the shield is positioned outside of parts subject to vacuum pressure (e.g., from a vacuum source 58, shown in FIGS. 12 and 13) and is therefore not exposed to a vacuum.

It is known that an alternating magnetic field may be created when an alternating electrical current is applied to a primary of a transformer. According to Faraday's law, an electric current will be induced within a secondary of the transformer if it is located within the magnetic field of the primary. In inductive heating, such as used herein, the induction source 18 (e.g., coil) is the inductor (primary) and a part (i.e., the shield with the material to be melted therein, which is secondary) is placed within the inductor's magnetic field. The shield is designed to capture at least some of the RF emitted from the primary source, which induces circulating eddy currents within the part. For both magnetic and non-magnetic metals, heating that occurs via the eddy currents are also referred to as the "Joule effect". For magnetic metals, additional heating can be performed by internal friction due to electrical resistance to the rapidly changing magnetic field (hysteresis).

As schematically shown in FIGS. 1 and 2, in one embodiment, a shield 22 is positioned adjacent to induction source 18 and body 12 of vessel 10. The shield 22 may be configured to substantially surround the source 18, for example (e.g., outside the induction source). In an embodiment, the outer diameter of the induction source 18 is smaller than the outer diameter of the shield 22. In an embodiment, the shield 22 may be positioned against a platen or against a plunger rod in the injection system.

It should be noted that although FIGS. 1 and 2 illustrate the shield 22 as a layer or sheet, the illustration is not meant to limit the configuration. Rather, the illustrated shield 22 is a representative depiction of a possible location of the shield relative to the induction source 18 and/or body 12. The shield may be formed from one or more plates, for example. The shield may also include one or more layers. Also, the shield may include openings or spaces therein, and/or be positioned at different locations relative to the induction source 18 and/or body 12, and is not limited to a solid structure positioned substantially therearound. The shield 22 can be formed from any number of materials and need not be continuous.

The body of the shield can be formed in any number of configurations. The shield can be in a cylindrical configuration, for example. In an embodiment, the shield can be formed from a sheet of material (e.g., metal). In an embodiment, the ends of the shield may be substantially open. The shield may be made from a conductive metallic material such as copper, nickel or stainless steel, or other material(s).

Figure 3:
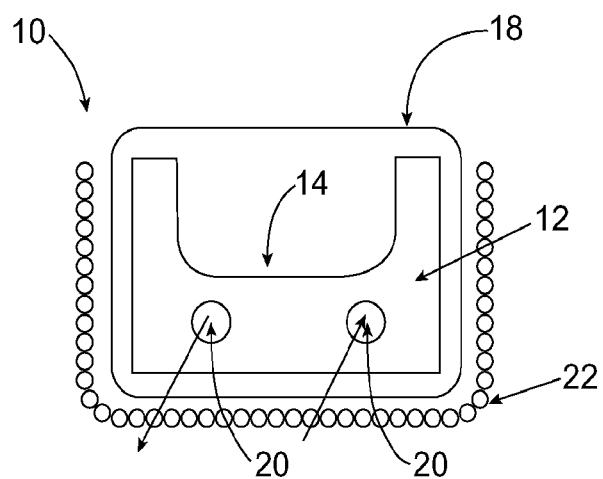
FIG. 3 illustrates a schematic plan view of an end of a vessel with a shield comprising tubes in accordance with an embodiment.

In an embodiment, the shield has a body formed from a first tube configuration that is configured to flow a liquid therein. For example, the end view of FIG. 3 illustrates an example of a shield 22 of tubular construction for liquid to flow therein. In one embodiment, the first tube configuration may include at least one tube that is independent from any other cooling source. In another embodiment, the first tube configuration and cooling line(s) (e.g., element 20, shown in FIG. 3) share the same source of cooling liquid (e.g., water) configured to flow therein. For example, the tube configuration may be formed from a forced-cooled metal tube, made of copper or that is copper-based. The tube configuration may be formed from any number of materials and comprise any dimension (e.g., inner or outer diameter).

Figure 6:

In one embodiment, the first tube configuration is positioned in a helical configuration, such as depicted in FIG. 6(B). The tube or tubes may be positioned to surround the induction source 18 (e.g., wrap helically around). For example, each helical wrap of the tube(s) may be positioned substantially close to an adjacent tube, or a space may be provided between each.

Figure 9:
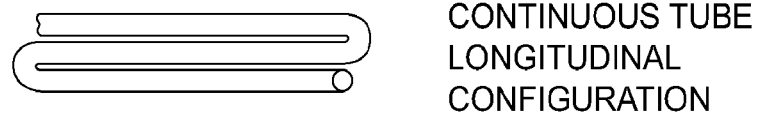

In an embodiment, the first tube configuration includes a single, continuous tube with an inlet and an outlet for flowing the liquid therein and therethrough, such as depicted in FIG. 6(A). Although shown as a coil, FIG. 6(A) represents a single tube configured to be positioned in any number of ways adjacent the induction source 18. For example, the single tube may be positioned in a longitudinal configuration as shown in FIG. 9. The detailed view of the tubes in FIG. 9 show a continuous "U" or "S" shaped configuration that is designed to alternate and flow liquid back and forth (or end to end). Alternatively, the continuous tube may be positioned in an up and down manner, or a side to side manner. Accordingly, the positioning of the single tube adjacent to the induction source 18 is not meant to be limiting.

Figure 4:
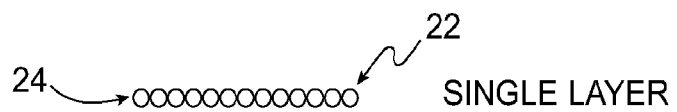
FIGS. 4-10 illustrate detailed views of parts of induction shields in accordance with embodiments.

FIG. 4 illustrates a detailed view of part of an induction shield 22 in accordance with an embodiment. The induction shield may be formed from a tube (or tubes) 24 positioned to form a row, array, or layer adjacent at least the induction source 18. In another embodiment, shown as shown in the detailed view of FIG. 5, the shield further includes a second tube configuration configured to flow a liquid therein. For example, the second tube configuration may be provided adjacent the first tube configuration.

The second tube configuration has at least one tube for flowing liquid therein. The second configuration can include a tube 26 or tubes near or adjacent to the tube (or tubes) 24 of the first configuration. The second tube configuration may include another set of tubes that may or may not be independent from the first tube configuration. In one embodiment, the second tube configuration may include at least one tube that is independent from any other cooling source. In another embodiment, the second tube configuration, the first tube configuration, and/or cooling line(s) (e.g., element 20, shown in FIG. 3) share the same source of cooling liquid (e.g., water) configured to flow therein. For example, the second tube configuration may be formed from a forced-cooled metal tube, made of copper or that is copper-based. The second tube configuration may be formed from any number of materials and comprise any dimension (e.g., inner or outer diameter).

Figure 5:
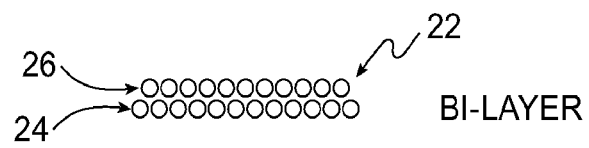

In one embodiment, the second tube configuration is positioned in a helical configuration. The tube or tubes may be positioned to surround the induction source 18 (e.g., wrap helically around) and/or the first tube configuration. For example, each helical wrap of the tube(s) may be positioned substantially close to an adjacent tube, or a space may be provided between each. The tube (or tubes) 26 may be positioned to form a row, array, or layer adjacent at least the induction source 18, and/or the tube(s) 24 of the first tube configuration. In one embodiment, the second tube configuration is positioned adjacent spaced areas of the first tube configuration, which is generally shown in FIG. 5, for example.

In an embodiment, the second tube configuration may include a single, continuous tube with an inlet and an outlet for flowing the liquid therein and therethrough, such as depicted in FIG. 6(A). Again, although shown as a coil, FIG. 6(A) represents a single tube configured to be positioned in any number of ways adjacent the induction source 18. For example, the single tube of the second tube configuration may be positioned in a longitudinal configuration as shown in FIG. 9. The detailed view of the tubes in FIG. 9 show a continuous U or S shaped configuration that is designed to alternate and flow liquid back and forth (or end to end). Alternatively, the continuous tube may be positioned in an up and down manner, or a side to side manner. Accordingly, the positioning of the single tube adjacent to the induction source 18 is not meant to be limiting.

In an embodiment, the tube(s) 24 of the first tube configuration may be positioned in a first direction, and the tube(s) 26 of the second tube configuration may be positioned in a second direction. For example, the tube(s) 24 of the first tube configuration may be positioned in a helical configuration relative to the induction source 18 and/or boat 12, while the tube(s) 26 of the second tube configuration are positioned longitudinally relative to the induction source 18 and/or boat 12. Again, such an example does not limit the configuration of the one or more tube(s) of the first and/or second tube configurations.

In another embodiment, the shield is a combination of a forced-cooled tube and a sheet. For example, the shield can be a combination of a metallic sheet and a cooling tube (of any configuration and attached to or positioned adjacent to the sheet). For example, during melting of material, the sheet is configured to absorb the RF from the induction source (and can heat up), and the cooling tube is configured to remove the heat from the sheet.

Figure 7:
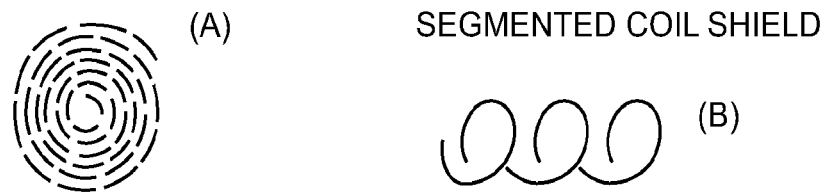

In an embodiment, the shield has a segmented configuration. FIG. 7 schematically depicts such an example. The shield may include a plurality of tubes configured to flow a liquid therein, with each of the tubes comprising an inlet and an outlet. That is, either or both of the first and second tube configurations may include two or more tubes. For example, FIG. 6(B) illustrates a number of tubes configured to be positioned substantially around and adjacent to at least induction source 18 in a longitudinal or horizontal configuration relative to the source 18 or body 12 (e.g., as shown in FIG. 1). The sheet may be segmented in the form of a plurality of tiles or parts that are connected together to form a sheet. An insulating material (such a grout) may be used to electrically disconnect and insulate the parts. Either the sheet or the tube, or both, can act as a shield. In accordance with an embodiment, their locations are relative as long as they block the stray RF and are designed to remove the heat dissipated from the heating and melting system.

For explanatory purposes only, an example is herein described with reference to the first tube configuration having two or more tubes. In one embodiment, each of the tubes is fluidly connected to each other. That is, a liquid or fluid may be configured to flow from an outlet of one tube and into the inlet of another tube, and so on. In another embodiment, the shield is an array of tubes.

Figure 8:

In any of the above described embodiments, the tube or tubes of either or both of the first and/or second tube configurations include at least one electrically insulated tube, as noted in FIG. 8. In an embodiment wherein a cooling tube is adhered to the sheet, both the tube and the sheet are configured to be insulated (i.e., electrically disconnected or insulated from one another). For example, in an embodiment, an interface of a non-conducting material is applied to ends of the tube in order to transfer the cooling liquid or fluid (e.g., water) from one tube to the other without leaking. As examples, an electrically insulative material such as Teflon in the form of a manifold and/or an o-ring seal could be used between tubing parts that form the cooling tube. However, such examples are not meant to be limiting.

Figure 10:
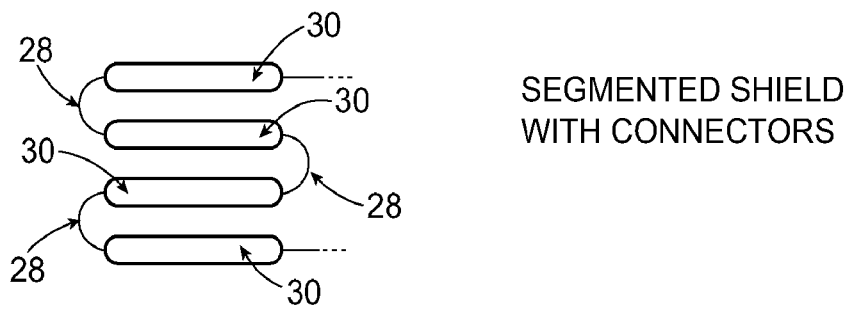

In another embodiment, the flow of the liquid therein is configured to be continuous, but may be electrically non-continuous in the first tube configuration. In other words, multiple segments of the tubes can be connected such that they are fluidly connected but not electrically connected (insulated from each other). FIG. 10 illustrates this embodiment of the shield, wherein tubes 28 are connected at each end (e.g., at an inlet and an outlet) by coupling segments 30. Coupling segments 30 are configured to flow a liquid therein and therethrough to connected tubes 28. Coupling segments 30 may be made of any material, and can be of any dimension. In an embodiment, each of the tubes 28 is copper-based and the coupling segments 30 are formed from a plastic material. In an embodiment, the coupling segments 30 each comprise an inner diameter similar to the inner diameter of the tubes 28.

FIG. 10 illustrates one embodiment of the tubes 28 that are substantially "U" shaped and connected by linear coupling segments 30 to form a shield comprising substantially "S" shaped segments. However, it should be noted that the tubes 28 may be connected and positioned to form a helical pattern (e.g., such as shown in FIG. 6(B)), a longitudinal or horizontal configuration (e.g., such as shown in FIG. 9), or may be provided in other positions or patterns not shown herein when positioned relative to the induction source 18.

Figure 11:
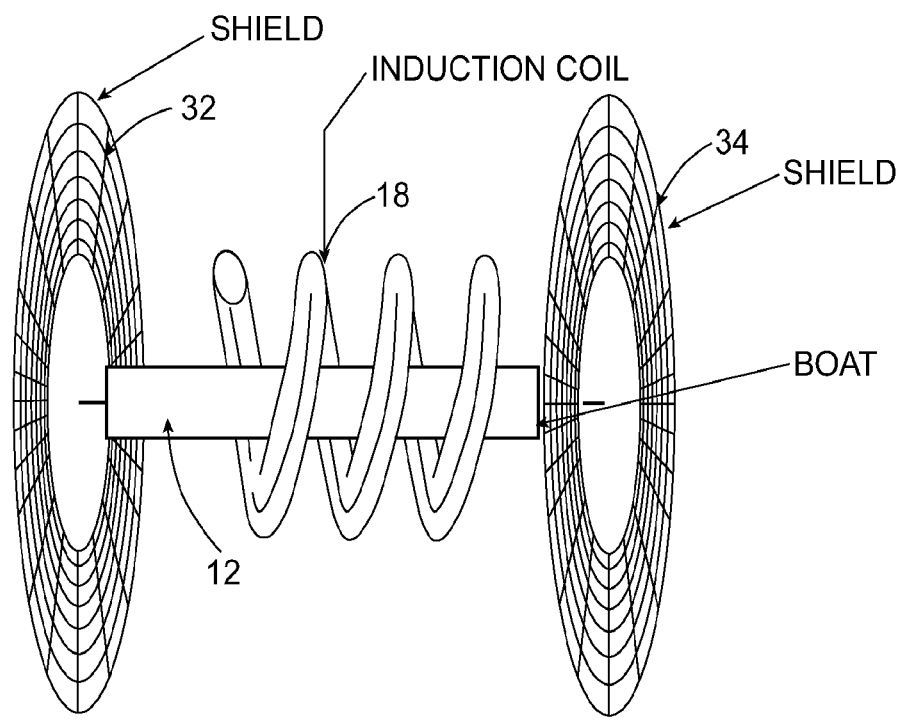
FIG. 11 illustrates a schematic plan view of a vessel with a surrounding induction coil and an induction shield in accordance with another embodiment.

In accordance with yet another embodiment, as shown in FIG. 11, the shield is positioned adjacent to at least one end of the vessel 10. For example, FIG. 11 shows the shield comprising a first part 32 and a second part 34 at either end of the body and adjacent the induction source 18. The first part 32 and/or second part 34 may have a configuration that includes a single, continuous tube with an inlet and an outlet for flowing the liquid therein and therethrough. In an embodiment, one or both of the first and second parts 32 and 34 is in the form of a spiral coil to shield both ends of the vessel 10. The spiral coils may be substantially flat, for example. In some embodiments, the first and/or second parts 32 and 34 may be formed in a coil configuration as shown in FIG. 6(A) and/or FIG. 7.

In yet another embodiment, the shield may have a configuration in the form of cells or a mesh-like configuration, also called a Faraday cage, that is positioned adjacent to the induction source 18 and that does not include a cooling line associated therewith. The Faraday cage may be positioned relative to the induction source 18 and have any number of configurations. In one embodiment, the Faraday cage is configured to be positioned substantially around the induction source 18 and the body 12 to substantially surround the vessel in a configuration similar to the shield 22 shown in FIG. 1. In another embodiment, the Faraday cage has more than one part. For example, the cage may have two or more portions that are positioned relative to the induction source, e.g., near a top and a bottom, near ends, etc. In another embodiment, the cells or mesh-like configuration of the shield may be formed adjacent the longitudinal sides of the vessel. For example, in the embodiment of FIG. 11 illustrates a shield configuration in the form of a Faraday cage having a parts 32 and 34 of cellular or mesh-like configuration that are configured to substantially reduce emissions emitted from the induction source (during its use). Such a cellular or mesh-like configuration has a surface area that is configured to absorb and/or to dissipate the heat which is gathered from the stray RF during melting of the meltable material in the body 12.

In accordance with some embodiments, it is envisioned that additional structures may be included with any of the herein described shield configurations. For example, one or more of the shields described herein in FIGS. 1-11 may include fins attached thereto. Referring to FIGS. 1 and 2, for example, the shield may be configured to have a plurality of fins extending radially from a surface of the shield. The fins may extend towards the body 12 and induction source 18 (e.g., inside the shield), or away from the body 12 and induction source 18 (e.g., from the outside of the shield), or both. Fins may be provided between layers of a shield comprising one or more layers. Fins may also be provided between adjacent parts of a shield, e.g., between segments and/or between adjacent structures. In an embodiment, fins may also be provided with a mesh or Faraday cage configuration.

In some cases, although a cooling line may not be associated with a shield (e.g, such as a shield that has a mesh configuration like that shown in FIG. 11), an optional convection cooling system may be associated with the injection system. As shown in FIGS. 12 and 13, an optional cooling system 56, which may include a fan or similar cooling device, can be used to cool the shield (e.g., mesh or fins) in accordance with an embodiment. The optional cooling system may be positioned adjacent to the shield, for example. In one embodiment, the optional convection cooling system may be associated with the injection system in addition to the cooling lines that are associated with the shield. Accordingly, the use and/or implementation of a cooling system are not meant to be limiting.

Alternatively, in an embodiment, either or both of the parts 32 and 34 of the shield are a sheet with cooling lines on or adjacent their sides (not shown).

In another embodiment, the shield (regardless of geometry or orientation) can have multiple layers of conducting material separated by insulating layers to improve the shielding performance of the shield.

In another embodiment, the shield can be designed to improve the efficiency of the induction heater by improving the resonance of the system. This is possible because the RF shielding couples inductively to the induction source as well as the rest of the melt system, changing the inductive loading of the entire system and, therefore, the resonant frequency (frequency at which power can be transmitted from the induction source (coil) to the melting material) of the system.

The dimensions, features, and/or parameters of the shield, including thickness, geometry, material, layering, etc, can be adjusted to achieve desirable results. For example, the features may be adjusted to achieve specific resonant frequencies which facilitate heating of different alloys.

In another embodiment, the coil is electrically grounded (earthed) to allow DC currents to dissipate, placing the shield at the same electrical potential (voltage) as the rest of the machine.

In another embodiment, the coil is floating (not earthed), which allows it to float at a higher or lower potential relative to the rest of the casting machine.

It should be noted that features and illustrations of the shield in this disclosure are not meant to be limiting. The dimensions and configuration of the shield can be adjusted and/or changed such that the meltable material inserted into the body 12 is more efficient melted by the induction source 18. In an embodiment, for example, a thickness or a depth of the shield may be related to an operating frequency of the induction source and/or the material(s) being used to form the shield. For example, the operating frequency regime of the induction source can be between about 1 kHz to about 500 kHz. Accordingly, in an embodiment, the thickness of the shield positioned adjacent to the induction source can be dependent upon a skin depth of the EM field (from the induction source during use) for the material out of which the shield is made. For example, in some embodiments, the shield may be formed from copper (or copper alloy). FIG. 14 shows a chart 60 illustrating an exemplary relationship between skin depth (or thickness) (in millimeters, mm) of a shield made of copper and a frequency of an induction source in a range between 1-200 kHz. As shown, as the frequency of the induction source increases from about 0 kHz to about 200 kHz, the skin depth of a shield made of copper decreases (the skin thickness or depth is inversely proportional to the operating frequency of the induction source). According to FIG. 14, for a frequency range between 1 kHz-200 kHz, the shield thickness can be between about 10 mm to about 0.3 mm, to reduce the current density by $1/e$ ($\sim 0.37$). Of course, the use of copper for the shield and its inversely proportional reaction is only exemplary. Other materials may be used to form the shield, and may have alternate thicknesses based on the operating frequency of the induction source. Accordingly, it should be understood that the thickness or depth of the shield, (as well as its other dimensions) and its configuration, in any of the herein disclosed embodiments, may be formed relative to or based on the material(s) used to form the shield and/or the operating frequency of the induction source.

The location(s) or positioning of the shield adjacent to at least the induction source 18, no matter its configuration, is not meant to be limiting. For example, the distance for which the shield is positioned (or its tube(s)) in any of the herein illustrated and described configurations can vary and/or depend on the features and configuration of the induction source 18. In one embodiment, the shield is configured to be approximately 2 to approximately 4 inches from the induction source 18 (e.g., around or from the ends).

As such, each of the herein disclosed embodiments of the induction shield is configured to shield RF from the induction source as well as act as heat absorbing (or removal) elements. The induction shield assists in compacting the melt zone of the system by absorbing stray RF (and thus any heat produced therefrom) and can act as a flux concentrator to control magnetic field distribution and thus heat patterns from the induction source 18. This in turn reduces heating and/or overheating of devices and components of the system surrounding the vessel and induction source. It also increases efficiency of the casting process, while decreasing the time for melting/heating meltable material.

The application or apparatus that utilizes vessel 10 and the herein described shield configuration(s) should also not be limiting. FIGS. 12 and 13 illustrate embodiments of exemplary injection molding systems 100 and 102 for implementing shields such. For example, FIG. 12 illustrates a schematic illustration of a system 100 with the shield 22 described in FIG. 1, and FIG. 12 illustrates a schematic illustration of a system 102 with shield 22 and shields 32 and 34 as described in FIG. 11. However, the injection molding system can implement any one or more of the coil/shield configurations illustrated in FIGS. 1-11. Such a system can utilize a silver boat style melting system, in which a water-cooled, spoon-shaped cavity (receiving portion) formed in a conductive metal base or body (such as copper) is placed within an induction coil in order to melt a material (e.g., metal or alloy) placed inside the cavity of the vessel. The system may perform insertion of the material and melting under vacuum pressure (e.g., using vacuum source 58). However, in some embodiments, the shield is generally configured to be disposed outside of the area under vacuum and thus not exposed thereto.

The above described embodiments may be used in any number of manufacturing methods or processes for melting material, such as amorphous alloy. By obtaining a vessel 10 and/or a shield (as shown in any of the Figures), a method for melting can be implemented. In some instances, an induction shield can be obtained and positioned adjacent at least an induction source in an injection system.

In an embodiment, when using a system (such as shown in FIG. 12, for example), the method of melting and manufacturing a part can include inserting or inputting material into a loading port 50 (e.g., in the form of an ingot) and such that it is received in a melting portion 14 of the body 12 (e.g., via an insertion port). After material is received by body 12, the surfaces of the vessel 10 and thus the material can be heated and melted via activating a heat source (induction coil 18) provided adjacent the vessel 10 (e.g., using power supply). While heating and melting, in some embodiments, cooling liquid flows through cooling lines 20 of the vessel 10 to assist in regulating the temperature (i.e., heat is absorbed, vessel is cooled) and maintained at a consistent temperature. Also, the shield (e.g., 22 or 32 and 34) is configured to substantially reduce and/or absorb emissions (e.g., heat, RF) emitted from the heat source (induction coil 18). Vacuum pressure may also be applied during the method of melting. After material is melted, it can be moved into a mold 54 of the system, for example.

More specifically, after melting material, the injection molding system such as shown in FIG. 12 may be configured to inject the molten material into a mold in a substantially horizontal direction by moving a plunger 52 in a longitudinal and/or horizontal direction, for example. The plunger may be configured to push a material for melting into the body 12, and/or move the melted material from the melting portion 14 in a substantially horizontal direction through a transfer sleeve (also called a cold sleeve) and into mold 54 for molding (such as a vacuum mold). Such a system, however, is not meant to be limiting.

The herein disclosed shield configurations may also be applied to skull melt crucibles, which may also include an induction shield in accordance with any of the herein disclosed embodiments, for example, in order to heat a metal charge inside the crucible and to melt the alloy charge through eddy current heating.

Accordingly, the herein described implementations and configurations of the shield in the injection system assist in improving overall performance for heating materials and/or amorphous alloys. In addition to the above mentioned features, the addition of the shield assists in overall improved performance of the machine. For example, the herein described shield configurations substantially reduce and/or prevent unwanted power loss due to magnetic field and hysteresis heatings. It also optimizes energy use. Furthermore, the disclosed induction shield reduces the amount of heat transfer to adjacent parts of the system (e.g., transfer/cold sleeve, platen). Moreover, in some embodiments, the addition of one or more induction shields to an injection system can reduce or shorten dimensions of parts in an injection system (e.g., cold sleeve, platen), and thus reduce the size of the machine. By shortening parts such as the transfer sleeve and including the shield, the time for melting meltable material is decreased because of the increased heating efficiency of the melt zone and because there is less or no need to overheat the meltable material to compensate for any heat loss between and during melting and transport to the mold. Accordingly, the induction shield reduces heat loss and increases chances of obtaining a more substantially uniform melt and thus a more substantially uniform homogeneous molded part. That is, because the shield allows the material to remain hotter in its molten state as it enters the mold, the glass-formability is improved as well because the cooling rate of the material is much more rapid as it enters the mold at a higher temperature, and is, therefore, rapidly quenched.

The aforedescribed shield configuration(s) may be used in combination with a vessel or crucible in a fabrication device and/or process including using BMG (or amorphous alloys). Because of the superior properties of BMG, BMG can be made into structural components in a variety of devices and parts. One such type of device is an electronic device.

While the principles of the disclosure have been made clear in the illustrative embodiments set forth above, it will be apparent to those skilled in the art that various modifications may be made to the structure, arrangement, proportion, elements, materials, and components used in the practice of the disclosure.

It will be appreciated that various of the above-disclosed and other features and functions, or alternatives thereof, may be desirably combined into many other different systems/devices or applications. Various presently unforeseen or unanticipated alternatives, modifications, variations, or improvements therein may be subsequently made by those skilled in the art which are also intended to be encompassed by the following claims.

What is claimed is:

1. An induction shield, comprising:
a helical coil formed from at least a first tube and a second tube electrically insulated from the first tube, the helical coil configured to encircle an induction source proximate a vessel configured to receive a material to be melted therein;
wherein the shield is configured to absorb radiofrequency (RF) emissions emitted from the induction source during use; and
wherein the shield is electrically disconnected from the induction source.

2. The shield according to claim 1, wherein the shield further comprises an additional tube configured to flow a liquid therein and positioned adjacent the helical coil.

3. The shield according to claim 2, wherein the additional tube is positioned adjacent spaced areas of the helical coil.

4. The shield according to claim 1, wherein the first and second tubes are configured to flow a liquid therein, each of the first and second tubes comprising an inlet and an outlet.

5. The shield according to claim 4, wherein the first and second tubes are fluidly connected to each other.

6. The shield according to claim 1, wherein the shield is further configured to substantially absorb heat emitted from the induction coil.

7. The shield according to claim 1, wherein the shield is further configured to be positioned adjacent a convection cooling system that is configured to cool the shield.

8. The shield according to claim 1, wherein adjacent portions of the helical coil are positioned substantially close to each other or spaced apart.

9. A method for melting a material comprising:
providing the material on a melting portion of a vessel configured to receive the material;
melting the material using an induction source provided adjacent to the vessel;
absorbing RF emissions from the induction source using a shield electrically disconnected from the induction source, the shield at least partially surrounding the induction source and comprising a first tube and a second tube electrically insulated from the first tube, the first and second tubes in a tube configuration selected from a helical coil configuration, a serpentine configuration, and an array of tube segments; and
flowing a fluid through the first and a second tubes.

10. The method according to claim 9, wherein:
the tube configuration is a first tube configuration;
the shield further comprises a second tube configuration configured to flow a liquid therein and positioned adjacent the first tube configuration; and
the method further comprises flowing the fluid in the second tube configuration during the melting.

11. The method according to claim 9, wherein:
the first and second tubes have the helical coil configuration; and
the method further comprises flowing the fluid in a helical path through the first and second tubes.

12. The method according to claim 9, wherein:
the emissions further comprise heat emitted from the induction source during melting; and
the method further comprises, while melting the material, absorbing heat emissions with the induction shield.

13. The method according to claim 9, wherein the first and second tubes are configured to flow a liquid therein, each of the first and second tubes comprising an inlet and an outlet.

14. The method according to claim 13, wherein the first and second tubes are fluidly connected to each other.

15. A system comprising:
a vessel;
an induction coil; and
an induction shield at least partially surrounding the induction coil and the vessel and comprising a first tube and a second tube electrically insulated from the first tube, the first and second tubes configured to flow a liquid therein;
wherein the induction shield is electrically disconnected from the induction coil.

16. The system of claim 15, wherein first and second tubes define a central bore.

17. The system of claim 15, wherein the first and second tubes define a serpentine shape.

18. The system of claim 15, wherein the first and second tubes define a helical shape.

19. The system of claim 18, wherein the induction shield is configured to inductively couple to the induction source.

20. The system of claim 15, wherein the induction shield is electrically grounded.

* * * * *